United States Patent [19]

Urban

[11] Patent Number: 5,316,115
[45] Date of Patent: May 31, 1994

[54] BRAKE ACTUATOR

[75] Inventor: John A. Urban, Plainwell, Mich.

[73] Assignee: Lucas Industries public limited company, West Midlands, England

[21] Appl. No.: 604,659

[22] Filed: Oct. 26, 1990

[30] Foreign Application Priority Data

Nov. 4, 1989 [GB] United Kingdom ............ 8924962

[51] Int. Cl.⁵ .................................................. F16D 65/78
[52] U.S. Cl. .................................. 188/325; 188/79.55
[58] Field of Search .............. 188/78, 79.55, 79.62, 188/264 B, 329, 330

[56] References Cited

U.S. PATENT DOCUMENTS

| 3,722,634 | 3/1973 | Osagawara et al. | 188/73.37 |
| 4,234,172 | 11/1980 | Takahashi | 188/298 |
| 4,502,572 | 3/1985 | Davidson et al. | 188/264 B |
| 4,813,516 | 3/1989 | Urban | 188/79.55 |
| 5,069,313 | 12/1991 | Kato et al. | 188/73.31 |
| 5,094,323 | 3/1992 | Mitchell | 188/73.31 |

Primary Examiner—Robert J. Oberleitner
Assistant Examiner—Chris Schwartz
Attorney, Agent, or Firm—Trexler, Bushnell, Giangiorgi & Blackstone, Ltd.

[57] ABSTRACT

A brake actuator has a housing containing tappets operable by a cam to apply brake shoes against a rotary brake drum. The housing defines a cavity to which lubricant is admitted. A flexible element which is not compressed at the maximum positive system lubricant pressure and is disposed within the cavity and subject to lubricant pressure. The element is movable during outward movement of the tappets to compensate for any increase in volume of the cavity caused by tappet outward movement. This avoids the occurrence of negative pressure in the cavity.

13 Claims, 3 Drawing Sheets

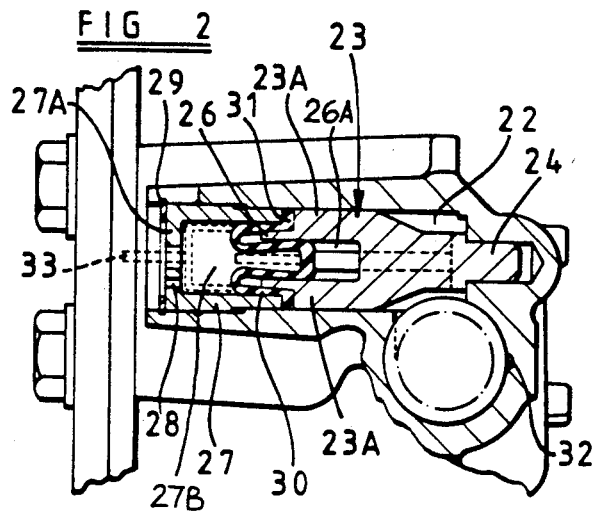
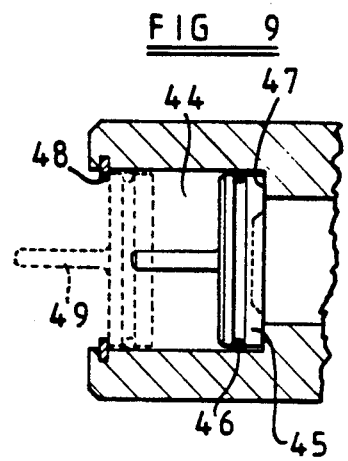
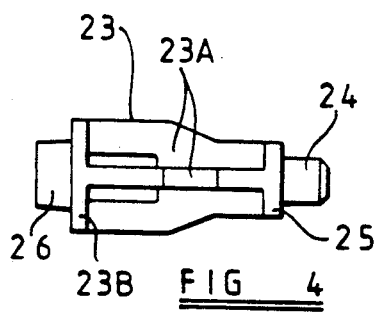
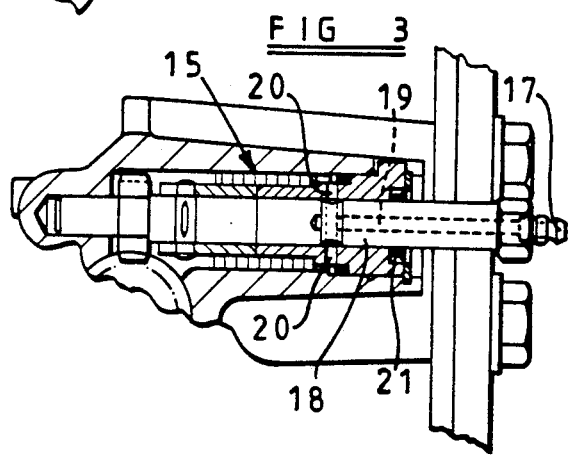
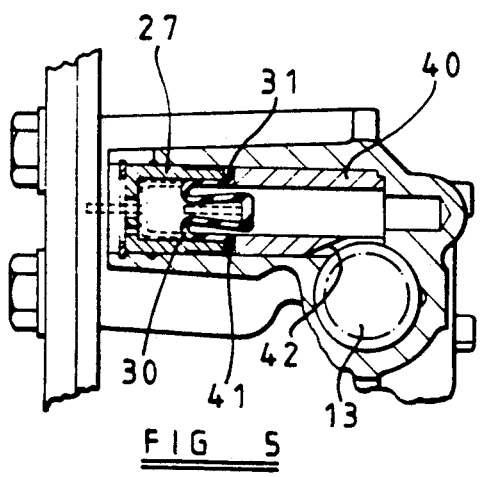
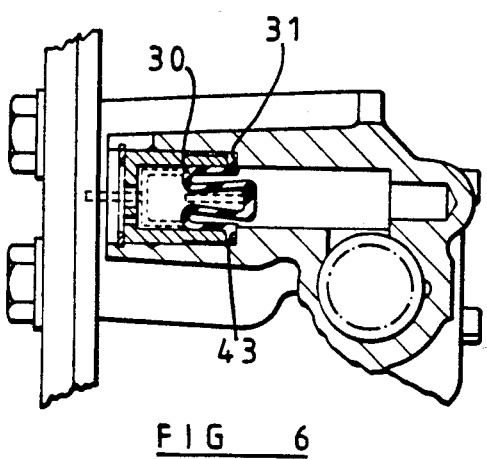

BRAKE ACTUATOR

This invention relates to a brake actuator incorporating a lubrication system and is particularly concerned with a lubricated actuator for an internal shoe drum brake.

It is common practice for the working mechanisms of brake actuators to be provided with lubricating means which typically consist of one or more grease nipples through which grease may be injected into internal passageways which distribute the grease throughout the mechanism. In some commonly used actuating mechanisms, in which the principal force-applying means is in the form of a cam or wedge, the braking force is applied to one or more friction elements by way of sliding tappets which move between extended and retracted positions. Moreover, such tappets are often associated with automatic adjusters which operate to adjust the tappets outwardly in order to compensate for wear of the friction elements. Movement of the tappets during actuation and adjustment causes the internal volume of the actuator housing to vary and the consequent pressure differences within the housing can lead to lubricant being forced from the housing, in the case of a decrease in housing volume, or to an ingress of air, or other fluids, and possibly injurious materials to the housing, in the case of a volume increase, neither of which conditions is desirable.

In one earlier proposal aimed at avoiding the occurrence of these conditions, the actuator housing contains a compressible device in the form of a closed cell foam body which is intended to act, in response to variations in internal volume of the housing during brake operation, to maintain a positive system lubrication pressure in the housing. Although such an arrangement can operate satisfactorily for a time, it has been found difficult to maintain an adequate positive pressure within the housing over a prolonged period of use, which is a desirable requirement in any practical actuator intended for use on a vehicle in order to minimise servicing.

An object of the invention is to provide an improved brake actuator in which adequate lubrication may be maintained over a longer period than in the aforesaid earlier proposal.

According to the present invention, a brake actuator comprises a housing, force transmission means in the housing operable by a mechanical actuator to apply a friction element to a rotary member to be braked, means for the admission of lubricant to a cavity within said housing, means for establishing a predetermined maximum positive system lubricant pressure, and an element within said cavity and subject to lubricant pressure which is not compressed at the maximum positive system lubricant pressure, the element exerting substantially no pressure on the lubricant but being movable during outward movement of said transmission means so as to compensate for any increase in volume of the cavity caused by said outward movement and thereby substantially to avoid the occurrence of negative pressure in the cavity.

Preferably, the element is flexible and typically in the form of a diaphragm which conveniently partially defines the cavity.

Alternatively, the element is relatively rigid, being then preferably in the form of a piston.

The invention will now be described, by way of example, with reference to the accompanying drawings in which:

FIG. 2 is a cross-sectional view along the line C—C of FIG. 1;

FIG. 3 is a cross-sectional view along the line B—B of FIG. 1;

FIG. 4 is an elevation of one of the actuator components;

FIGS. 5 and 6 are views similar to FIG. 3 respectively illustrating alternative ways of locating the movable element;

FIG. 9 is a fragmentary view showing an alternative form of movable element.

Figure 1:
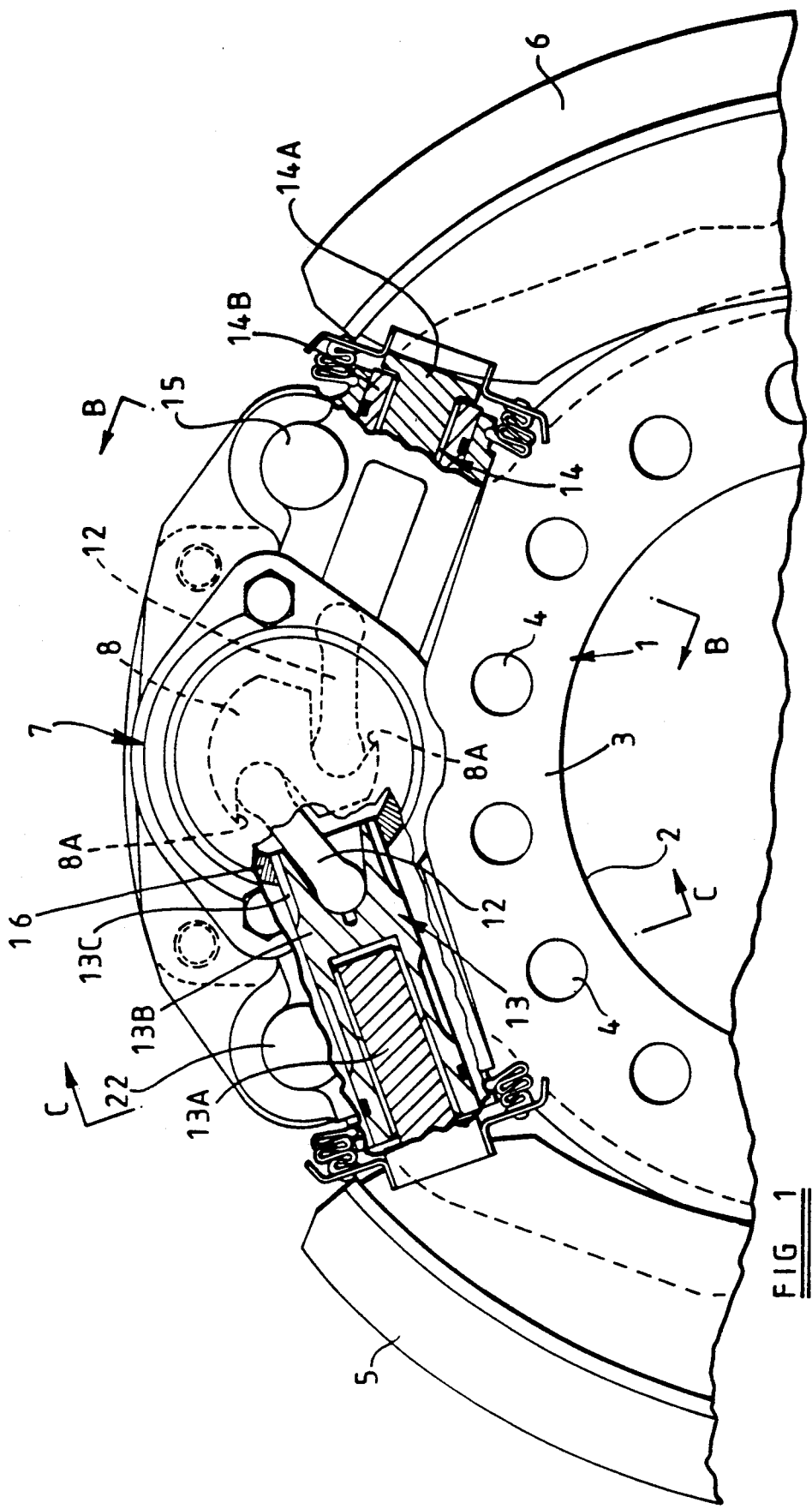
FIG. 1 is a fragmentary elevation of one embodiment of an internal shoe drum brake incorporating one form of the actuator of the invention.

Referring to FIG. 1, this shows part of an internal shoe drum brake having a torque plate 1 formed with a central opening 2 defined by a flange 3 in which are formed openings 4 for mounting the torque plate on an axle assembly (not shown) of a vehicle, in known manner. The torque plate 1 carries a pair of brake shoes 5, 6, between the illustrated adjacent ends of which is disposed a brake actuator, indicated generally at 7, operable to expand the shoes 5, 6 into braking engagement with a rotary brake drum (not shown). A fixed abutment assembly would normally be disposed between the opposite pair of adjacent shoe ends, as will be understood by a person familiar with the art. The actuator 7 includes a rotary cam 8 carried by a cam shaft (neither of which are illustrated) the cam shaft being rotatably supported within a tubular member which is fixed to and projects perpendicularly from the torque plate 1 in conventional manner. The cam shaft is fast for rotation at its outermost end with a suitable actuating lever (not shown).

The cam 8 is provided at opposed locations thereon with a pair of pockets 8A which receive the respective ends of actuating struts 12, each of which cooperates with a respective one of opposed actuator tappets 13, 14 axially slidable within the actuator housing, each tappet being associated with a respective one of the brake shoes 5, 6. Each tappet 13, 14 is in the form of a strut composed of a pair of threadedly inter-engaged tappet parts. One such part, in the form of a threaded tappet screw 13A, 14A is engaged with the adjacent brake shoe and the other part 13B, 14B is in the form of an internally threaded tappet sleeve receiving the respective screw therein, the inner end of each sleeve being engaged by the adjacent one of the struts 12. The lengths of the tappets may be varied, in known manner, in response to wear of the brake shoes 5, 6 by a conventional adjuster mechanism, indicated generally at 15, which will not be described in detail since it forms no part of the present invention. In the particular arrangement described, the adjuster 15 is directly associated with only the tappet 14, and a toothed crown wheel 16 engages gear formations on the tappets, one of which formations can be seen at 13C, in order to transmit adjusting movement of the tappet 14 to the tappet 13 so that the shoes are adjusted simultaneously by operation of the single adjuster.

The entire actuating mechanism, including the cam, tappets and adjusters is lubricated by lubricant supplied to the interior of the actuator housing by means of a single lubricant fitting in the form of a nipple 17 (FIG. 3) provided on a shaft 18 forming part of the adjuster mechanism 15. Grease enters the adjuster mechanism along a drilling 19 in the shaft 18 and through radial passages 20 into the housing through which it is distributed under pressure so as to reach both of the adjustable tappets and the adjuster mechanism 15 itself. When the actuator housing is full of lubricant, the lubricant flows into the tubular member which supports the cam shaft and the attainment of a predetermined lubricant pressure causes excess lubricant to be expelled via a convenient relief valve illustrated as a lip seal 21 surrounding the shaft 18 adjacent the outer end of the latter. The relief valve mainly acts to establish a predetermined maximum positive system lubricant pressure. The relief valve may alternatively be incorporated at the free end of the cam tube.

A chamber 22 is formed in the left hand portion of the actuator housing, as viewed in FIG. 1, and contains a plug 23 which is located in the housing by way of a smaller diameter cylindrical end portion 24 thereof. The main body of the plug is of generally cruciform cross-section, having four mutually equi-angularly spaced fins 23A lying longitudinally inwardly of a cylindrical boss 25 of slightly greater diameter than the portion 24, the fins terminating at a flange 23B. The inner extremity of the plug is formed with a projecting hollow cylindrical portion 26 which lies within an open end of a sleeve 27 disposed within the housing, a closed end 27A of the sleeve forming an end of the chamber 22 and being provided with a circular row of equi-spaced through holes 28. The sleeve is retained in place by a circlip 29 engaged within a groove of the housing.

A flexible impermeable diaphragm 30 is disposed within a chamber 27B defined by the sleeve 27 and a generally radial flange 31 of the diaphragm is trapped between the inner end of the sleeve 27 and a shoulder formed at the junction between the hollow cylindrical part 26 and the flange 23B of the plug 23. As can be seen in FIG. 2, the diaphragm 30 may enter a chamber 26A formed in the hollow part 26 and lie within the fins 23A of the plug and this occurs under certain operational conditions to be described hereafter.

When the actuator is new or freshly serviced, grease injected through the nipple 17 will fill the entire actuator housing, entering the chamber 22 by way of a passage 32 formed in the actuator housing and extending lengthwise of the tappet 13. The diaphragm 30 will be unrolled within the chamber 27B by the lubricant pressure and pushed against the closed end 27A of the sleeve 27, as illustrated in broken lines in FIG. 2. Any air lying behind the diaphragm is expelled through the orifices 28 as the diaphragm moves towards the end 27A. At this stage therefore, the diaphragm lies inertly against the sleeve end 27A and exerts no pressure on the lubricant.

When the actuator is operated to expand the brake shoes 5 and 6, the tappets 13, 14 are required to move outwardly, thereby effectively increasing the internal volume of the actuator and tending to create a low pressure therein. However, in the actuator of the invention, the diaphragm 30 is able to move away from its position against the closed end of the sleeve 27 (shown in broken lines) to an extent determined by the operative positions assumed by the tappets to compensate for any such increase in volume, returning towards its aforesaid position under the action of the lubricant as the tappets and brake shoes retract. The creation of a negative pressure within the housing is thus prevented and the risk of foreign material being drawn into the housing is substantially obviated. Upon retraction of the brake shoes, the diaphragm is urged by the lubricant back to its rest position against the closed end of the sleeve.

In the present embodiment, the tappets are such that their lengths are increased for adjustment purposes and their retracted positions remain constant. This means that the volume of the housing cavity is not increased as a result of brake adjustment. It would be possible, however, to use an arrangement in which the brake is adjusted by adjusting the tappets outwardly to new retracted positions, resulting in an increase in volume of the housing cavity and the diaphragm or other movable element is able to compensate for this by assuming a rest position clear of the end of the sleeve 27. In the case of a diaphragm, it may assume an extreme position illustrated in full lines in FIG. 2 in which a central convoluted portion thereof enters the hollow portion 26 of the plug 23.

It would be possible for the diaphragm to be provided with a tongue 33, illustrated in dotted lines in FIG. 2, projecting from a generally central location of its outer surface, and this would project through a central hole in the sleeve end 27A to provide an indication that sufficient lubricant remains within the housing. The disappearance of the tongue inside the housing in the released condition of the brake signals that a lubrication operation is necessary.

FIG. 5 shows an alternative embodiment similar in construction and operation to that of FIG. 2 but in which the plug 23 is replaced by a plain sleeve 40 held within the housing by suitable means such as press-fitting and providing a shoulder 41, the flange 31 of the diaphragm 30 being trapped between this shoulder and the inner end of the sleeve 27. The sleeve 40 has a cut away part 42 to accommodate the adjacent tappet 13.

In the further alternative embodiment shown in FIG. 6 the actuator housing itself forms a shoulder 43 for engagement by the flange 31 of the diaphragm 30, rendering unnecessary the use of a separate component such as the plug 23 or sleeve 40 of previously described embodiments. The diaphragm flange is trapped between the shoulder 43 and the inner end of the sleeve 27. Operation of this embodiment is again similar to that of FIG. 2.

Figure 7:
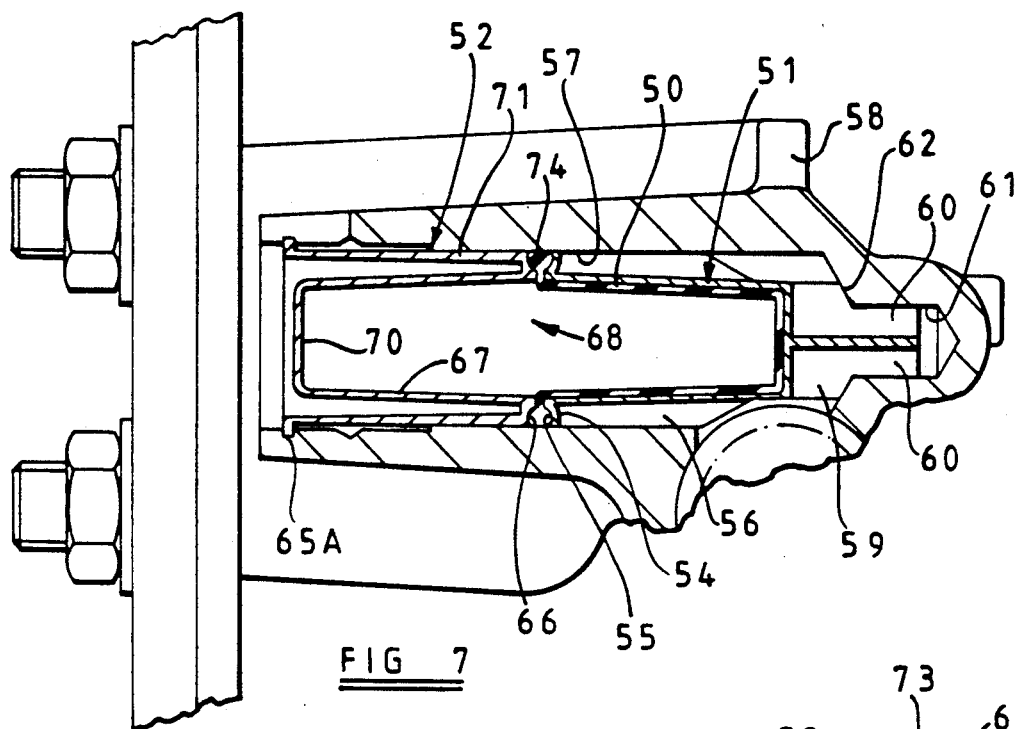
FIG. 7 is a cross-sectional view of part of a brake and illustrating a further alternative way locating the movable element.
Figure 8:
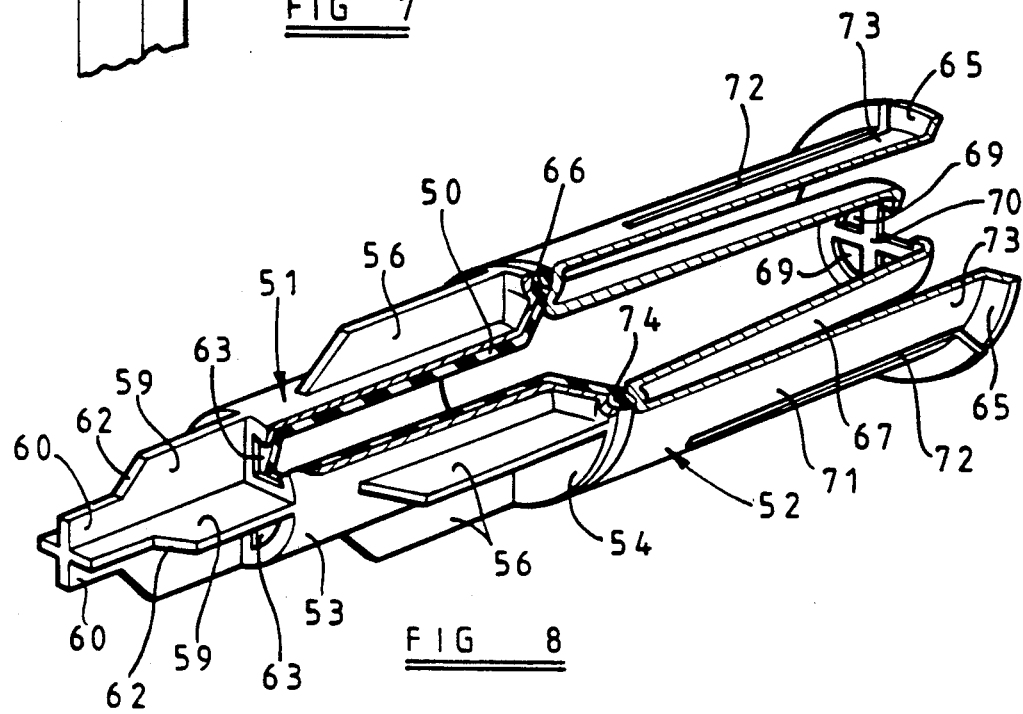
FIG. 8 is an enlarged perspective view of an assembly forming part of the arrangement of FIG. 7.

The embodiment illustrated in FIGS. 7 and 8 again employs a diaphragm 50 which is retained and supported by an assembly which includes a pair of components 51 and 52. The component 51 has a cylindrical body 53 terminating at one end in a lateral peripheral flange 54 of which the outermost surface is formed with a continuous arcuate recess 55. A plurality of equi-angularly spaced fins 56 project from the body 53 and serve to locate and support the component 51 within a bore 57 of the actuator housing 58. Axially extending fins 59 having a maximum radial extent equal to that of the body 53 project from the other end of the latter and are cut away radially at their free end portions 60 to fit within a bore 61 of the housing 58, being inserted in the latter to an extent permitted by an inclined shoulder 62 at the junction between the full diameter and cut away fin portions. The end of the body 53 carrying the fins 59 is formed, between the fins, with through openings 63.

The component 52 is generally cylindrical, having a peripheral flange 65 at one end thereof and having on its opposite end an arcuate recess 66 generally complementary with the recess 55 of component 51. The component 52 has a generally cylindrical slightly inwardly tapered inner portion 67, one end 68 of which is open and the other of which forms a plurality of openings 69 defined by a cruciform end element 70. An outer cylindrical portion 71 is divided by equi-angularly spaced longitudinal slots 72 into a plurality of fingers 73, each of which carries a part of the flange 65, the fingers being resilient and flexible for the purpose to be described. The diaphragm 50 is retained in the assembly by trapping a peripheral bead 74 thereof between the respective recesses 55, 66 of the components 51, 52, and the assembly described is retained in its illustrated working relationship by cooperation with the actuator assembly when installed therein.

Such installation is accomplished by first introducing the component 51 with the diaphragm mounted thereon into the actuator body through an opening therein at a location opposite to the bore 61 and pushing it into its illustrated position. The component is preferably dimensioned so as to be a light push fit in the body and thereby held in position. The component 52 is then introduced and contracted by resilient inward deformation of the fingers 73 sufficiently to permit entry of the component into the housing and movement thereof into its illustrated position in which the diaphragm bead 74 is trapped between the opposed recesses 55, 66 of the components. Release of the fingers enables their inherent resilience to return them to positions in which the flange portions 65 snap-engage in an internal groove 65A of the housing in order to lock the assembly securely in position. Grease injected into the housing as previously described pushes the diaphragm inwardly against the end 70 of the inner portion 67, the diaphragm acting to prevent the build-up of negative pressure, as before. The openings 63 permit entry of grease into engagement with the diaphragm and the holes 69 permit passage of air to equalise pressure in the housing as the diaphragm moves.

The movable element illustrated as a flexible diaphragm in the previously described embodiments may be replaced by a rigid component and an embodiment using such a component is illustrated in FIG. 9. The end portion of the actuator housing remote from the tappets and which previously housed the sleeve 27 is now open ended and forms a cylinder 44 housing a piston 45 sealed against the cylinder by a seal 46. Inward movement of the piston along the cylinder is limited by a shoulder 47 of the housing and movement in the opposite direction by a circlip 48 which also serves to retain the piston within the cylinder. The extreme positions of the piston are illustrated respectively in full and broken lines. The piston may be provided with an indicator tongue 49 similar to that shown at 33 in the previous embodiments. The piston moves to compensate for variations in the volume of the housing cavity in a manner similar to the previously described diaphragm.

In a modified arrangement applicable to any embodiment of the invention, the relief means may be incorporated in the movable element.

It will be seen that the invention provides a simple and convenient arrangement which can compensate for lubricant pressure changes within the actuator housing without the necessity for the movable element to exert a constant positive pressure on the lubricant. It also provides the possibility for a simple and effective lubricant condition indicator, if required.

I claim:

1. A brake actuator comprising a housing, force transmission means in the housing operable by a mechanical actuator to apply a friction element to a rotary member to be braked, means for the admission of lubricant to a cavity within said housing, means for establishing a predetermined maximum positive system lubricant pressure, and an element within said cavity, said element being of material which is not compressed at said maximum positive system lubricant pressure and subject at one side thereof to lubricant pressure and at an opposite side to atmospheric pressure, whereby the element exerts substantially no pressure on the lubricant but is movable during outward movement of said transmission means so as to compensate for any increase in volume of the cavity caused by said outward movement and thereby substantially to avoid the occurrence of negative pressure in the cavity.

2. A brake actuator according to claim 1, wherein the non-compressible element is a flexible diaphragm.

3. A brake actuator according to claim 1, wherein the non-compressible element partially defines the cavity.

4. A brake actuator according to claim 1, wherein the element is retained peripherally within the housing by means defining a first chamber which receives the element in expanded condition when the cavity is full of lubricant.

5. A brake actuator according to claim 4 wherein the element is retained peripherally between said means in the form of a first component which forms said first chamber receiving the expanded element and a second component which forms a second chamber arranged to receive the element when moved to compensate for an increase in volume of the cavity.

6. A brake actuator according to claim 5, wherein said first and second chambers of the first and second components are generally coaxially arranged.

7. A brake actuator according to claim 5, wherein the second chamber of the second component is of smaller transverse dimension relative to said first chamber.

8. A brake actuator comprising a housing, force transmission means in the housing operable by a mechanical actuator to apply a friction element to a rotary member to be braked, means for the admission of lubricant to a cavity within said housing, means for establishing a predetermined maximum positive system lubricant pressure, and an element within said cavity and subject to lubricant pressure which is not compressed at said maximum positive system lubricant pressure, the element exerting substantially no pressure on the lubricant but being movable during outward movement of said transmission means so as to compensate for any increase in volume of the cavity caused by said outward movement and thereby substantially to avoid the occurrence of negative pressure in the cavity, wherein the element is retained peripherally within the housing by means defining a first chamber which receives the element in expanded condition when the cavity is full of lubricant and wherein the element is retained peripherally between said means in the form of a first component which forms said first chamber receiving the expanded element and a second component which forms a second chamber arranged to receive the element when moved to compensate for an increase in volume of the cavity and further wherein said means is a sleeve having an open end through which the element is able to move between the respective chambers in the first and second components, and an opposite closed end against which the element is supported in its expanded condition, the closed end having an aperture therethrough to permit equalization of pressure at either side of said closed end during movement of the element.

9. A brake actuator comprising a housing, force transmission means in the housing operable by a mechanical actuator to apply a friction element to a rotary member to be braked, means for the admission of lubricant to a cavity within said housing, means for establishing a predetermined maximum positive system lubricant pressure, and an element within said cavity and subject to lubricant pressure which is not compressed at said maximum positive system lubricant pressure, the element exerting substantially no pressure on the lubricant but being movable during outward movement of said transmission means so as to compensate for any increase in volume of the cavity caused by said outward movement and thereby substantially to avoid the occurrence of negative pressure in the cavity, wherein the element is retained peripherally within the housing by means defining a first chamber which receives the element in expanded condition when the cavity is full of lubricant and wherein the element is retained peripherally between said means in the form of a first component which forms said first chamber receiving the expanded element and a second component which forms a second chamber arranged to receive the element when moved to compensate for an increase in volume of the cavity and further wherein the second component includes a pair of axially spaced flanges interconnected by a plurality of angularly spaced generally radial webs, the flanges supporting respective bosses, one of which is received within a complementary bore of the housing and the other of which defines at least a part of the chamber of the second component.

10. A brake actuator comprising a housing, force transmission means in the housing operable by a mechanical actuator to apply a friction element to a rotary member to be braked, means for the admission of lubricant to a cavity within said housing, means for establishing a predetermined maximum positive system lubricant pressure, and a non-compressible element within said cavity and subject to lubricant pressure, the element exerting substantially no pressure on the lubricant but being movable during outward movement of said transmission means so as to compensate for any increase in volume of the cavity caused by said outward movement and thereby substantially to avoid the occurrence of negative pressure in the cavity.

11. A brake actuator comprising a housing, force transmission means in the housing operable by a mechanical actuator to apply a friction element to a rotary member to be braked, means for the admission of lubricant to a cavity within said housing, means for establishing a predetermined maximum positive system lubricant pressure, and an element within said cavity and subject to lubricant pressure which is not compressed at said maximum positive system lubricant pressure, the element exerting substantially no pressure on the lubricant but being movable during outward movement of said transmission means so as to compensate for any increase in volume of the cavity caused by said outward movement and thereby substantially to avoid the occurrence of negative pressure in the cavity, wherein the movable element carries a tongue which projects to the exterior of the housing in the brake-release condition of the actuator when sufficient lubricant remains within the housing.

12. A brake actuator comprising a housing, force transmission means in the housing operable by a mechanical actuator to apply a friction element to a rotary member to be braked, means for the admission of lubricant to a cavity within said housing, means for establishing a predetermined maximum positive system lubricant pressure, and an element within said cavity and subject to lubricant pressure which is not compressed at said maximum positive system lubricant pressure, the element exerting substantially no pressure on the lubricant but being movable during outward movement of said transmission means so as to compensate for any increase in volume of the cavity caused by said outward movement and thereby substantially to avoid the occurrence of negative pressure in the cavity, wherein the first component includes a generally cylindrical inner portion which defines the chamber of this component, and an outer surrounding portion divided to form a plurality of flexible fingers each carrying part of a radial end flange, such that inward compression of the fingers permits the first component to enter the housing and to be locked therein by resilient recovery of the fingers permitting the flange to enter an internal groove of the housing to lock the first component in position.

13. A brake actuator according to claim 12, wherein the first component includes a cylindrical portion defining said second chamber, the cylindrical portion having a plurality of angularly spaced radial fins serving to support said component within the housing.

* * * * *